No. 612,773. Patented Oct. 18, 1898.
P. D. HARTON.
CAKE CUTTING MACHINE.
(Application filed Jan. 6, 1898.)
(No Model.) 5 Sheets—Sheet 3.
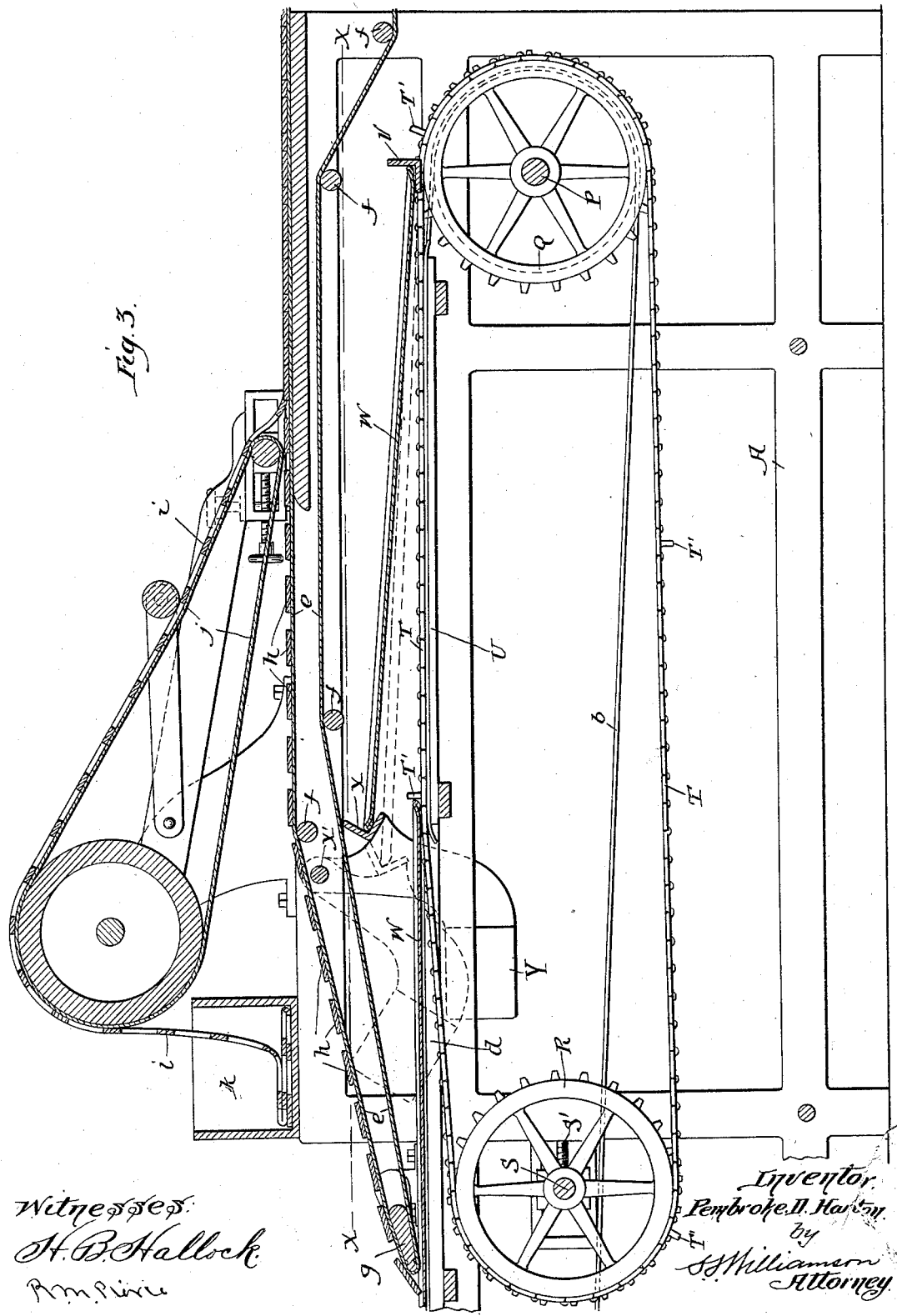

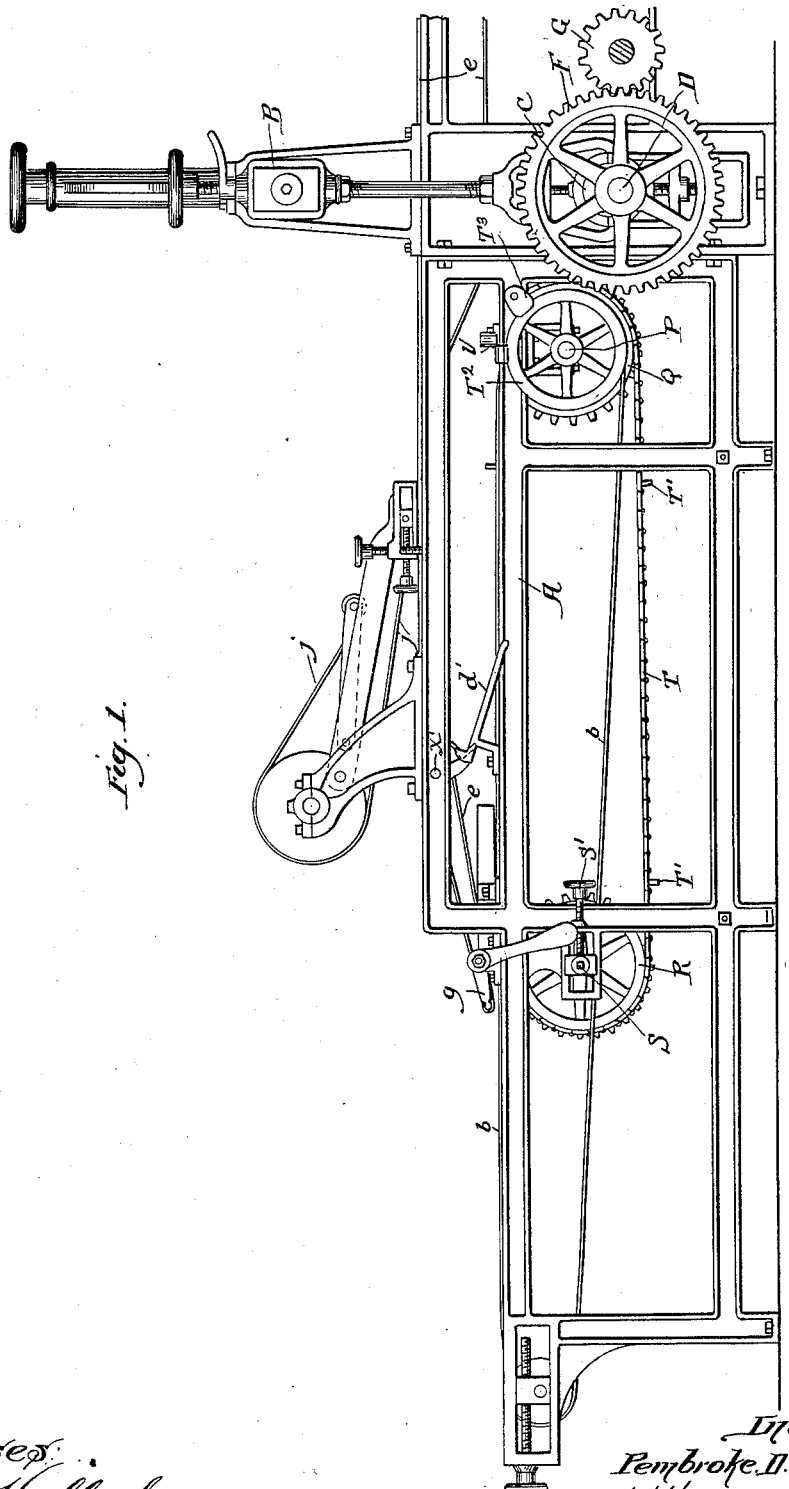

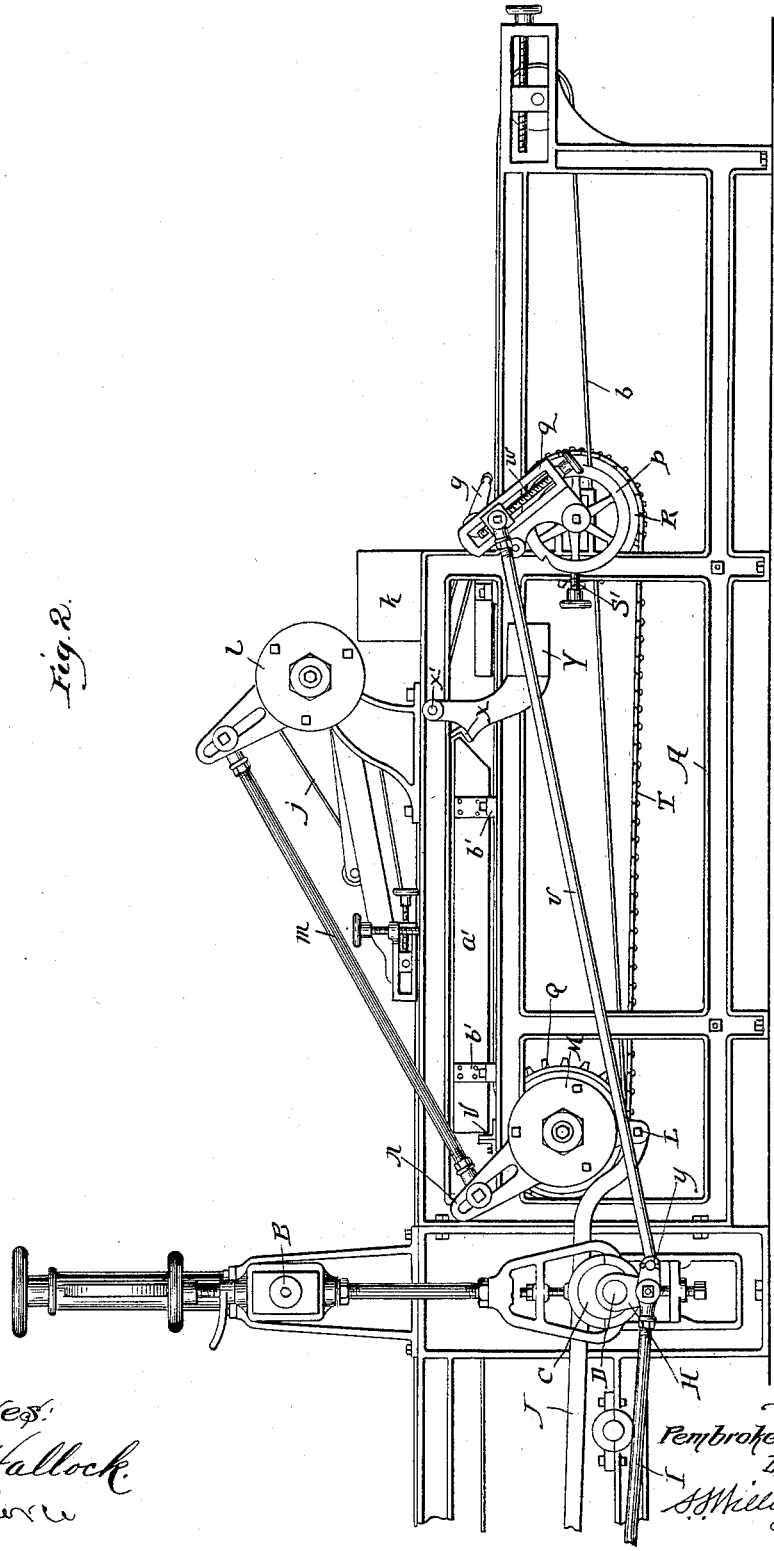

No. 612,773. Patented Oct. 18, 1898.
P. D. HARTON.
CAKE CUTTING MACHINE.
(Application filed Jan. 6, 1898.)
(No Model.) 5 Sheets—Sheet 4.
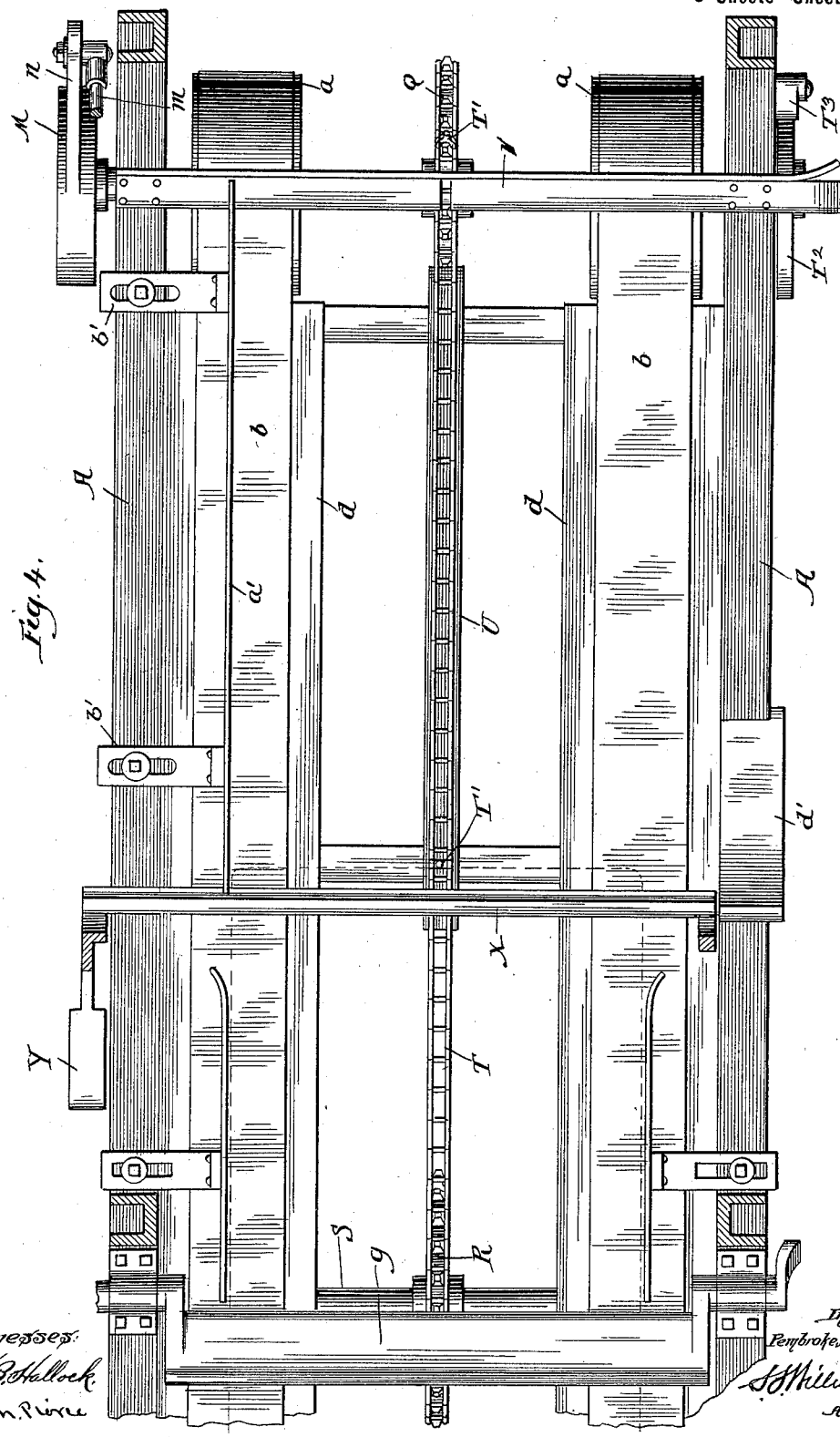

No. 612,773. Patented Oct. 18, 1898.
P. D. HARTON.
CAKE CUTTING MACHINE.
(Application filed Jan. 6, 1898.)
(No Model.) 5 Sheets—Sheet 5.
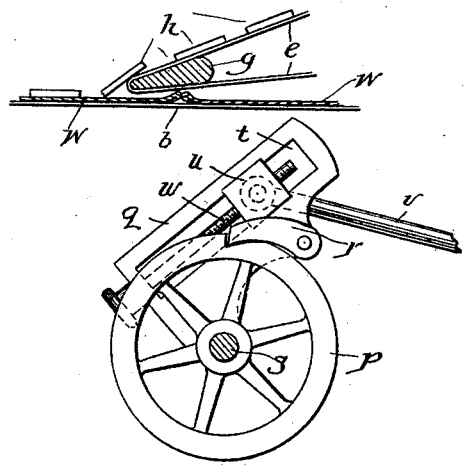
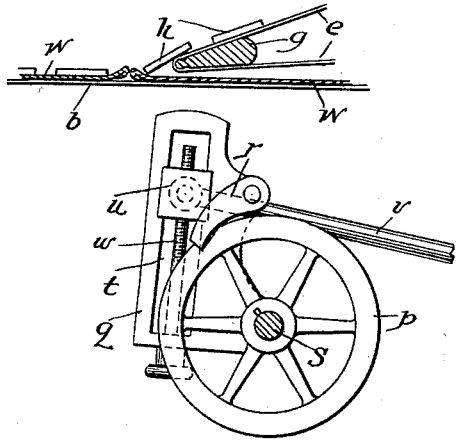
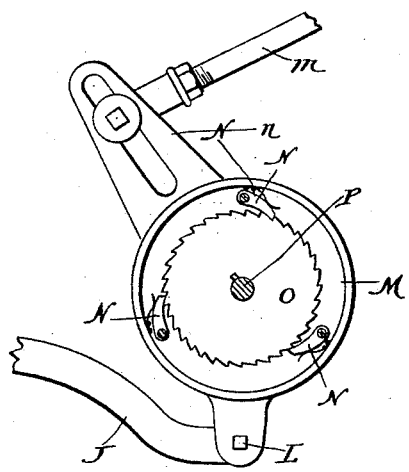
Witnesses:
H. B. Hallock
R. M. Pierce
Inventor:
Pembroke D. Harton
by J. J. Williamson
Attorney.
THE NORRIS PETERS CO., PHOTO-LITHO., WASHINGTON, D. C.

UNITED STATES PATENT OFFICE.

PEMBROKE D. HARTON, OF PHILADELPHIA, PENNSYLVANIA.

CAKE-CUTTING MACHINE.

SPECIFICATION forming part of Letters Patent No. 612,773, dated October 18, 1898.

Application filed January 6, 1898. Serial No. 665,784. (No model.)

*To all whom it may concern:*

Be it known that I, PEMBROKE D. HARTON, a citizen of the United States, residing at Philadelphia, in the county of Philadelphia and State of Pennsylvania, have invented a certain new and useful Improvement in Cake-Cutting Machines, of which the following is a specification.

My invention relates to a new and useful improvement in cake-cutting machines, and has for its object to provide a simple and effective means of feeding the pans to the cake-blanks in order that the latter may be properly deposited thereon; and a further and improved object of my present improvement is to provide for the automatic insertion of the pans to the feed mechanism; and a still further object of my invention is to so construct the ratchet mechanism for jumping the pans, so as to avoid depositing the cake-blanks upon the edges thereof, as to bring each pan when jumped to the same position, whether the distance to which the pans are moved be more or less. An incidental object of this invention is to cause each pan when inserted in the train of pans to gain upon the pans preceding, so as to overtake and become the feeding force of the train.

With these and other ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a portion of a cutting-machine having my improvement applied thereto; Fig. 2, a similar view looking in the opposite side of the machine; Fig. 3, an enlarged section of that portion of the machine in which the pan-feeding mechanism is located; Fig. 4, a horizontal section at the line $x\ x$ of Fig. 3; Fig. 5, a diagrammatical view of the pawl mechanism for jumping the pans and showing one pan just prior to receiving the last row of cake-blanks; Fig. 6, a similar view, but showing a new pan having been jumped into place, the ratchet jumping mechanism being in a position which corresponds thereto; and Fig. 7, a detail view of the ratchet mechanism for operating the carrier-chain of the pan-feeding mechanism.

In carrying out my invention as here embodied, A represents the frame of the machine, which is of any suitable construction, and B the head, in which the cutter-plunger is carried. This plunger receives its motion from the eccentrics C, carried upon the main shaft D, said shaft receiving its motion through the gear F, meshing with the drive-pinion G. Upon the opposite end of the shaft D is secured a short crank H, to which is attached the rod I, said rod extending rearward and being pivoted to the rod J, this connection being an ordinary arrangement and not here shown. The rod J is connected at its inner end, as indicated at L, to the pawl-disk M, said disk carrying the pawls N, here shown as three in number, the object being to avoid lost motion as far as possible by these pawls upon the ratchet O. The ratchet O is secured to the shaft P, and this shaft is suitably journaled within the frame of the machine and carries a sprocket-wheel Q. A corresponding sprocket-wheel R is secured upon the shaft S, which is adjustably journaled in the framework by means of suitable boxes and adjusting-screws S', and these two sprocket-wheels are connected by the sprocket-chain T, so that they move in unison during the travel of said chain, which latter has projecting therefrom at given intervals the pins T', said pins being for the purpose of feeding the pans, as will be hereinafter set forth. A friction-wheel $T^2$ is also secured upon the shaft P, and a friction-dog $T^3$ is so pivoted as to enter into engagement therewith in such manner as to prevent the retrograde movement of this friction-wheel, and consequently the retrograde movement of the sprocket-wheels and chain carried thereby.

A rail or support U is so arranged that the upper portion of a chain passes thereover in a horizontal tangential line from the sprocket-wheel Q, thence traveling downward from the rail to the sprocket-wheel R, and the object of this is to cause the pins T' to travel in a horizontal line through a certain distance and then recede from the plane of this line, so as to pass out of engagement with the pan last operated upon.

An angular cross-bar V is so located relative to the sprocket-wheel Q as to support one end of the pan W in such manner as to permit the pins T' to come in contact therewith when reaching the upper side of this wheel, so that thereafter these pins may force the pan forward. The opposite end of the pan is supported in an angular swinging bar X, as clearly shown in Fig. 3, and this bar is pivoted at X' and is weighted at Y, so that normally it will hold the pan in position when once inserted between the cross-bars V and X until sufficient force has been exerted upon the pan to swing the bar X to the position shown in dotted lines in Fig. 3, which will free the pan, so that it may drop from the cross-bar X into proper position relative to the train of pans, and thereafter form one of said train. Secured upon the shafts P and S are pulleys or drums $a$, over which run the belts $b$, and these belts are supported upon their upper side by the boards $d$, and when a pan is freed from the cross-bar X and drops downward it rests upon these belts, and in practice the belts travel at a slightly less rate of speed than the chain T, so that when the pins T' pass out of engagement with the pan by traveling down the incline from the end of the support U to the sprocket-wheel R the movement of the pan, which will thereafter be brought about by the belts alone, will be at a slightly-reduced rate, thus permitting the next pan which is dropped upon the belts and forced forward by the pins to overtake the pan just preceding and abut thereagainst, after which it will serve as the motor-power for continuing the movement of the train of pans, as will be readily understood.

$e$ represents the endless apron, which serves to convey the blanks from the cutter to the pans, as well as feed the dough to the cutter, and this carrier-apron passes over a series of guide-rolls $f$ and down and around a foot-board $g$, which is wedge shape in cross-section to cause the carrier-apron to make a short turn at this point and bring it into close proximity to the pans traveling therebeneath.

$h$ represents the blanks carried by the endless apron, and, as will be seen by reference to Fig. 3, when these blanks reach the turning-point of the apron around the footboard $g$ they will be deposited upon the pans row by row.

The scrap-dough (indicated at $i$) is led upward upon the endless belt $j$ and passes rearward and is deposited in a receptacle $k$.

As before described, the ratchet-wheel O is revolved intermittently step by step, and this in turn, through the shaft P and sprocket-wheel R, actuates the chain T, so that the pins thereon will cause the pans to travel step by step beneath the footboard for the reception of the cake-blanks, and this necessitates a similar feeding of the blanks, which is brought about by an intermittent motion being imparted to the endless apron $e$ by the ordinary mechanism. (Here not shown.) A corresponding intermittent motion is given to the scrap-dough by the ratchet mechanism $l$, which is connected through the rod $m$ to the arm $n$, projecting from the ratchet-disk M, as will be readily understood.

When each of the pans has been filled with the cake-blanks, it is necessary that it shall be given an extra movement forward, so as to carry it out of action and bring the next pan into position for the reception of the blanks, and this is accomplished by placing a single-toothed ratchet-wheel $p$ upon the shaft S and journaling a pawl-lever $q$ upon this shaft carrying a pawl $r$, adapted to engage with the tooth of the ratchet at predetermined intervals—that is to say, once in every revolution of the ratchet-wheel—and in order to prevent an overthrow of the ratchet, and consequently a displacement of the pan, I construct the pawl-lever in the form of a right angle, as clearly shown, having a slot $t$ formed tangentially to the movement of the pawl, so that when the block $u$, to which is pivoted the rod $v$, is adjusted within this slot to increase or decrease the throw of the lever, and consequently the distance through which the ratchet-wheel is to be turned, no additional movement will be added to the end of the active stroke of the pawl, but the entire increase or decrease will be added to or taken from the retrograde movement of said pawl, thus always bringing the ratchet-wheel to the same point, though giving it a greater movement by the pawl engaging with the tooth thereof sooner when adjusted for a longer stroke than when adjusted for a short stroke, and this will have the effect of jumping the pans for various-sized blanks, and always bringing them to the proper relative position to the foot-board to properly receive said blanks. This is a very important feature of my present invention, since it overcomes many of the difficulties which have heretofore existed in the adjustment of such machines.

The adjustment of the block $u$ in a slot to vary the throw of the pawl-lever is preferably accomplished by means of the threaded rod $w$, which passes through said block and feeds it in one direction or the other when the threaded rod is revolved. The rod $v$, which is pivoted to the block $u$, is pivoted at its opposite end to the small crank-arm $y$, carried by the crank H, and thereby given its reciprocating motion for the actuation of the pawl-lever $q$.

A gage-board $a'$ is carried by the adjustable clamps $b'$, which are attached to the frame of the machine by suitable set-screws, so that this board may be adjusted to limit the movement of the pan when being inserted upon the cross-bars, as before set forth, thus always bringing each pan in exact position, and a suitable guide $d'$ is so arranged as to assist in the insertion of the pans. The said guide is inclined and the upper end terminates in alinement with the angular swinging bar.

From the foregoing description the operation of my improvement will be obviously as follows: After the dough has been properly started upon the carrier-apron it first reaches the cutter, where the blanks are severed from the strip, and the scrap and blanks pass forward until reaching the belt $j$, from whence the scrap is led upward from this belt, while the blanks pass onward to the footboard, where they are deposited upon the pans. In the meantime the pans are inserted one by one between the angular cross-bars V and X, and when a pan has been thus inserted one of the pins $T'$ will come in contact with its lower edge and force it forward, which process will swing the cross-bar X to the position shown in dotted lines in Fig. 3 and free the upper edge of the pan, so that it may drop upon the belts $b$, and the movement of the pan will be continued by the action of the pin until the latter passes out of engagement therewith in traveling down the incline, as before set forth, after which the pan would continue to move with the belts until another pan has been similarly brought into place and has overtaken the first-named pan by receiving all the faster movements of the pins over that of the belts, thus closing the space between the two pans and propelling the train directly from the pins.

One of the principal features of my improvement is the arrangement for inserting the pans one by one within the train, which greatly facilitates the operation of the machine and avoids the possibility of a blank space being left, which has heretofore caused the waste of the blanks in being fed from the carrier-apron when not being received upon the pan; but by my present arrangement a pan may be inserted between the cross-bars V and X at leisure, and when the proper time arrives it will be placed within the train of pans automatically and without liability of missing.

It is to be noted that the footboard has no adjustment longitudinal of the machine; but in this respect any adjustment needed for the carrier-apron is provided at the opposite end of the machine. This has the effect to always maintain the footboard in the same position relative to the feed mechanism and pans which pass therebeneath.

Having thus fully described my invention, what I claim as new and useful is—

1. In a machine of the character described, an endless apron for feeding the dough and blanks, two endless belts arranged to pass beneath said apron, means for supporting a pan above the belt, means for forcing said pan from its support into the train of pans, as and for the purpose set forth.

2. In combination in a machine of the character described, a cake-blank-feeding mechanism, a pan-feeding mechanism, and supports for the reception of a pan so arranged that said pan may be forced by the pan-feeding mechanism from the support into the train of pans, as specified.

3. In a machine of the character described, suitable feeding mechanism for the cake-blanks, a sprocket-chain, pins carried thereby for feeding the pans, a stationary cross-bar upon which one end of the pan may rest, a swinging cross-bar upon which the opposite end of the pan may rest, and past which it may be forced by the pins so as to be put into the train of pans, and means for intermittently operating the sprocket-chain, as shown and described.

4. In combination, an endless apron for feeding the dough and blanks, two belts traveling beneath said apron, longitudinal boards upon which the upper sides of said belts travel, a sprocket-chain, two wheels over which said chain runs, a rail arranged to support a portion of the upper side of the chain, pins carried by said chain, a stationary cross-bar for supporting one end of a pan, a swinging cross-bar for supporting the opposite end of the pan and adapted to be forced out of engagement with the pan by the pins, a ratchet-wheel secured upon the shaft of one of the sprocket-wheels, pawl mechanism for supporting said ratchet, a single-toothed ratchet secured upon the shaft of the other sprocket-wheel, a right-angle pawl-lever pivoted concentric with the single-toothed ratchet-wheel, a pawl carried by said lever for actuating the ratchet, means for oscillating the pawl-lever, and means for adjusting the throw of said lever, as specified.

5. A pan-feeding mechanism for machines of the character described consisting of two sprocket-wheels both exactly the same size, a sprocket-chain connecting said wheels, a rail for supporting a portion of the upper side of the sprocket-chain whereby a portion thereof will pass downward at an angle in leaving the rail to reach one of the sprocket-wheels, pins carried by the sprocket-chain for feeding the pans and then passing out of engagement therewith, an angular swinging bar supporting the forward end of the pan and adapted to release the pan when said pan is engaged by the pin as and for the purpose set forth.

In testimony whereof I have hereunto affixed my signature in the presence of two subscribing witnesses.

PEMBROKE D. HARTON.

Witnesses:
 H. B. HALLOCK,
 R. M. PIERCE.